Patented Nov. 4, 1930

1,780,545

UNITED STATES PATENT OFFICE

GEORGE STAFFORD WHITBY, OF MONTREAL, QUEBEC, CANADA, ASSIGNOR, BY MESNE ASSIGNMENTS, TO THE ROESSLER & HASSLACHER CHEMICAL COMPANY, OF NEW YORK, N. Y., A CORPORATION OF DELAWARE

SUBSTITUTED THIURAM POLYSULPHIDE AND PROCESS OF MAKING

No Drawing.   Application filed April 28, 1928.   Serial No. 273,777.

The object of this invention is the preparation of new and useful compositions of matter by the treatment of salts of dithiocarbamic acids with sulphur chlorides. More particularly this invention relates to the products formed by treating the salts of substituted dithiocarbamic acids with sulphur monochloride or sulphur dichloride. I have found that the substances so formed may be used as accelerators of the vulcanization of rubber. This use is claimed by me in a co-pending application S. N. 84,154 filed by me of even date herewith. This application is a continuation in part of my application S. N. 84,153.

Throughout the specification I refer to specific sulphur chlorides as sulphur monochloride and sulphur dichloride giving formulas corresponding respectively to $S_2Cl_2$ and $SCl_2$. I do not wish to be limited in this since there is some doubt as to the existence or structure of the dichloride. However, I have found that by using the commonly called dichloride I obtain a definite compound of the same class as, but differing from, the product obtained by using the monochloride. Furthermore, sulphur is very soluble in these sulphur chlorides and may be present in molecules of a polysulphide nature having several loosely bound S atoms in addition to those ascribed to them by the formulæ. I therefore prefer to express the sulphur chlorides above referred to as $S_xCl_2$, wherein $x$ represents a whole number other than zero.

The dithiocarbamates used in my processes are represented by the general formula:

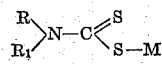

wherein R and $R_1$ are any similar or dissimilar organic radicals, and M is any metallic radical or equivalent group, such as zinc, sodium, potassium or ammonium, etc. The above, as will be seen, are disubstituted dithiocarbamates. I wish it understood that in case a "piperidyl" or any other bivalent radical is used, R and $R_1$ will become a single radical utilizing the double bond, but the dithiocarbamate will still be considered disubstituted.

I have discovered that if such a salt is treated with a sulphur chloride a reaction takes place between two moles of the dithiocarbamate and one mole of the sulphur chloride to form a new composition of matter. Substantially, I believe this reaction to be as follows:

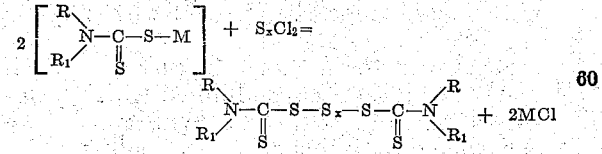

If, for example, ammonium phenyl ethyl dithiocarbamate is treated with sulphur monochloride a reaction takes place which I represent as follows:

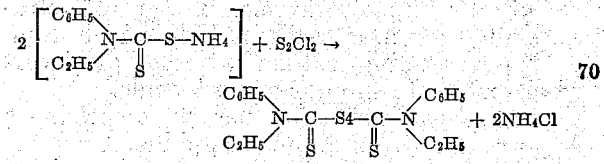

or if sulphur dichloride is used

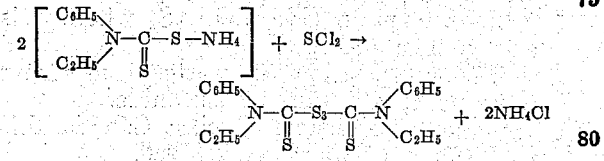

The ammonium chloride or, as the case may be, the metal chloride is always formed at the end of the reaction. The arrangement of the central sulphur atoms represented as $S_x$, $S_4$, or $S_3$ in unknown to me. I have, however, found that definite compositions are always formed as is shown by the properties of the various products. The products are simply named as substituted thiuram polysulphides.

I have prepared analogous materials from several dithiocarbamates and find the reaction similar in all cases. I have employed the dimethyl-, diethyl-, dibutyl-, dipropyl-, "piperidyl-," phenyl methyl-, phenyl ethyl-, dithiocarbamates. I have used zinc, sodium potassium and ammonium salts of these in a variety of liquids. I have found suitable media to be benzene, petroleum ether or sulphuric ether.

*Example*

The following example will serve to illustrate the method of preparation that I have used:

20.5 gms. powdered potassium dimethyldithiocarbamate was suspended in about 250 ccs. ether, cooled well with ice. While stirring vigorously by mechanical means, 8.7 gms. sulphur monochloride diluted with petroleum ether was gradually run in. The precipitate was filtered, washed with ether, and allowed to dry. This was powdered, suspended in water, filtered, washed with water, dried by suction, and finally allowed to dry completely in the air. Yield: 12.35 gms. of a cream colored powder. M.P.: about 108° (it turned yellow at 75°; shrunk at 92°, softened at 100°). Yield: 64%.

Claims:

1. The method of producing tetra alkyl polysulphides which comprises treating salts of dialkyl dithiocarbamic acid with sulphur chloride.

2. Process for the manufacture of a tetramethyl thiuram polysulphide which comprises reacting a salt of dimethyl dithiocarbamic acid with a chloride of sulphur.

3. Process for the manufacture of tetramethyl thiuram tetrasulphide which comprises reacting a salt of dimethyl dithiocarbamic acid with sulphur monochloride.

4. Process for the manufacture of tetramethyl thiuram tetrasulphide which comprises reacting sodium dimethyl dithiocarbamate with sulphur monochloride.

5. A composition of matter comprising a tetra alkyl thiuram tetrasulphide.

6. A composition of matter comprising tetra-methyl thiuram polysulphide of the general formula $(Me_2N.CS)_2S_x$ where $x$ is any whole number.

7. A composition of matter comprising tetra methyl thiuram tetrasulphide.

Signed at Montreal, Quebec, Canada, this twelfth day of March, A. D. 1920.

GEORGE STAFFORD WHITBY.